(12) United States Patent
Stepita-Klauco

(10) Patent No.: US 6,340,937 B1
(45) Date of Patent: Jan. 22, 2002

(54) SYSTEM AND METHOD FOR MAPPING MULTIPLE IDENTICAL CONSECUTIVE KEYSTROKES TO REPLACEMENT CHARACTERS

(76) Inventor: Matej Stepita-Klauco, 2548 Greer Rd., Palo Alto, CA (US) 94303

( * ) Notice: Subject to any disclaimer, the term of this patent is extended or adjusted under 35 U.S.C. 154(b) by 0 days.

(21) Appl. No.: 09/458,536

(22) Filed: Dec. 9, 1999

(51) Int. Cl.[7] ........................ H03K 17/94; H03M 11/00
(52) U.S. Cl. ........................ 341/23; 341/22; 341/26; 347/171; 400/110; 400/484
(58) Field of Search .................. 341/22, 26, 28; 345/171; 400/110, 484

(56) References Cited

U.S. PATENT DOCUMENTS

| | | | |
|---|---|---|---|
| 3,929,216 A | 12/1975 | Einbinder | |
| 4,454,592 A | 6/1984 | Cason et al. | |
| 5,225,833 A | 7/1993 | Fisher et al. | |
| 5,387,042 A | 2/1995 | Brown | |
| 5,802,482 A | 9/1998 | Sun | |
| 6,043,760 A | * 3/2000 | Laakkonen | 341/26 |

* cited by examiner

*Primary Examiner*—Timothy Edward, Jr.
(74) *Attorney, Agent, or Firm*—Pennie & Edmonds LLP

(57) ABSTRACT

A computer implemented method for allowing the entry of text in any number of languages using any keyboard chosen by the user. The computer implemented method monitors a user's keystrokes detecting the entry of multiple identical consecutive keystrokes of any diacritical character in a predefined set of characters, then maps the keystrokes to replacement characters. A diacritical character is a character with diacritical variations that change the sound or accent of that character. A predefined set of characters is that set of characters defined as the characters in a predefined or selected language that have diacritical variations. Thus, once multiple identical consecutive keystrokes of any key are detected, the method determines whether the multiple keystrokes are of a diacritical character or whether they are of some other character. If they are of a diacritical character, then the method maps the multiple keystrokes to a replacement character that is distinct from the diacritical character, otherwise, normal keystroke processing continues.

28 Claims, 2 Drawing Sheets

SYSTEM AND METHOD FOR MAPPING MULTIPLE IDENTICAL CONSECUTIVE KEYSTROKES TO REPLACEMENT CHARACTERS

The present invention relates generally to systems and methods that use computer keyboards for inputting information and, particularly, to systems and methods for mapping multiple identical consecutive keystrokes of one character into a replacement character not otherwise represented on the keyboard.

BACKGROUND OF THE INVENTION

With the information age rapidly shrinking the world's boundaries, and most forms of electronic voice and data communications becoming more prevalent, multi-lingual electronic voice and data communications are also becoming increasingly common. These multi-lingual communications are often computer generated written communications. Today, the basic scheme for accommodating electronic multi-lingual communication needs is by employing language translation software or language-specific software packages in combination with language specific keyboards.

While language translation software may do an adequate job for simple communications, this type of software generally has built-in limitations that can result in a message being translated in a way that does not quite convey the meaning, tone, or message intended by the author. As a result, multi-lingual users may prefer to personally compose a communication's text without relying on a piece of software to select words for them. In such a case, at present, the primary alternative is to employ language-specific software in combination with language-specific keyboards.

Language-specific software packages in combination with language-specific keyboards also have certain limitations and disadvantages. The basic layout of today's keyboards are inherited from the mechanical typewriter, and are available in several "national" layouts with different placement of alphabet characters and diacritical marks on the keyboard. And, most major software application programs are available in a multitude of languages. Thus, a user can purchase a different keyboard and accompanying software for each desired language. While the combination of language-specific software and keyboards may meet the user's needs in composing multi-lingual computer generated correspondence, it is both expensive and cumbersome. This scheme requires users to obtain and store both a software package and a physical keyboard specific to each language in which they would like to converse. Additionally, it can be challenging for multilingual users to remain proficient in entering text in different languages when having to use keyboards with different key layouts. A further complication arises when using portable equipment, in that it may be inconvenient or impossible to change the physical keyboard in portable equipment. Under such conditions, the user may have to resort to using only a mental image of a language specific keyboard layout.

It is an object of the present invention to provide a multi-language keyboard, allowing text entry in numerous languages using only one physical keyboard, with that one physical keyboard being any keyboard of the user's choosing.

SUMMARY OF THE INVENTION

In summary, the present invention is a computer implemented method for allowing the entry of text in any number of languages using any keyboard of the user's choosing. The computer implemented method monitors a user's keystrokes detecting multiple consecutive keystrokes of diacritical characters in a predefined set of characters, then maps the keystrokes to replacement characters.

A diacritical character is a character with diacritical variations that change the sound or accent of that character. For example, "e", "é" and "è" could be the diacritical variations on the diacritical character "e" in a particular language. A predefined set of characters is that set of characters defined as the characters in a selected language that have diacritical variations. Thus, once multiple identical consecutive keystrokes of any key are detected, the method determines whether the multiple keystrokes are of a diacritical character or whether they are of some other character. If they are of some other character, then normal keystroke processing continues. If the multiple keystrokes are of a diacritical character, then the method maps the multiple identical consecutive keystrokes to a replacement character that is distinct from the diacritical character.

In one embodiment of the invention, there exists a plurality of predefined language modules, with each language module defining a distinct set of mappings. Each distinct set of mappings includes a mapping for each diacritical variation of each diacritical character to a replacement character. The replacement character is entered into a text document or application program when the user enters multiple identical consecutive keystrokes of a diacritical character.

BRIEF DESCRIPTION OF THE DRAWINGS

Additional objects and features of the invention will be more readily apparent from the following detailed description and appended claims when taken in conjunction with the drawings, in which:

DESCRIPTION OF THE PREFERRED EMBODIMENTS

Figure 1:
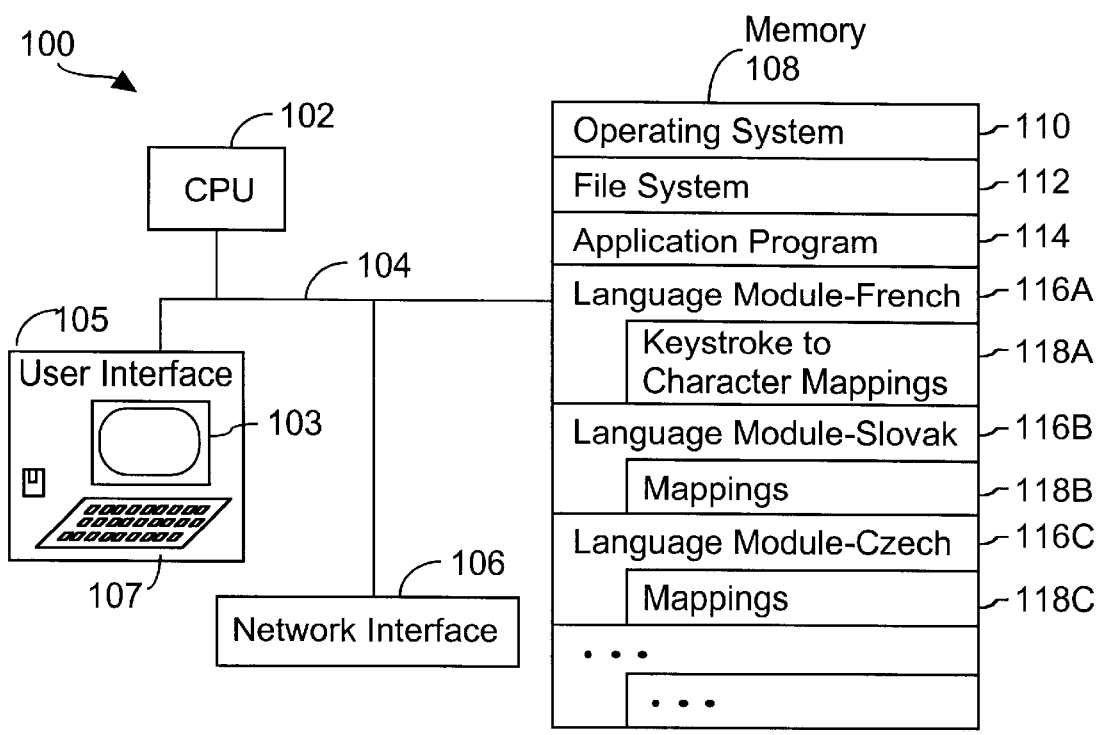
FIG. 1 is a block diagram of a system that may be used in accordance with an embodiment of the present invention.

Referring to FIG. 1, there is shown a block diagram of a computer system 100 in which the present invention can be implemented. The system 100 includes a central processing unit 102 that is coupled by one or more communication buses 104 to a user interface 105, a network interface 106, and memory 108. For the purposes of the present discussion, the system 100 may include any central processing unit 102, user interface 105, and network interface 106 suitable to meet a system's needs and requirements. In general, the user interface 105 will include a keyboard 107 and a display device 103.

In one embodiment of the invention, memory 108 is configured such that it includes an operating system 110, a file system 112, an application program 114, and language modules 116 (116A, 116B, etc.). The user may select any operating system 110, file system 112, and application program 114 that meets the user's needs and the system's requirements. Also, any module, for example application program 114, could be customized or modified to include specific features of the invention, or to act in concert with certain features of the invention.

Each language specific module 116 includes a distinct, language specific, set of keystroke to replacement character mappings 118, herein collectively called a "mapping" for ease of discussion. Each mapping 118 is defined in accordance with the diacritical variations of characters in a respective language such as French, German, Spanish, Slovak, Czech and so on. A diacritical variation of a character is a variation on a basic character, herein called a diacritical character, that changes the sound of that character and/or the accent on that character. For example, "e", "é", and "è" could be diacritical variations on the diacritical character "e" in a particular language. Not all characters in a language set are diacritical characters, because not all characters in a language set require or include diacritical variations. One language may have few diacritical characters and diacritical variations while another may have many.

Each language specific mapping 118 provides a replacement character to the application program when a user enters multiple identical consecutive keystrokes of any diacritical character in a predefined set of characters. The predefined set of characters is that set of characters that includes all diacritical characters identified in a particular language. The replacement character is the diacritical variation on a diacritical character that is mapped to a certain number of multiple identical consecutive keystrokes of that diacritical character.

Each distinct set of language specific mappings 118 is associated with, or forms part of the language specific module 116 for a particular language. For example, a first distinctive set of mappings 118A are identified with the language module 116A for the French language. Mappings 118A include a set of keystroke to character mappings for the diacritical character "e", as follows:

| Number of times key "e" is pressed | Replacement character |
| --- | --- |
| 1 | e |
| 2 | é |
| 3 | è |
| 4 | ê |
| 5 | e |

In the above example, the French language module 116A applies a distinctive set of mappings 118A for the French language, including mappings for four diacritical variations of the diacritical character "e". The distinctive set of mappings for the French language 118A maps a single keystroke of the "e" key to the "e" character, two consecutive keystrokes of the "e" key to the "e" with an accent aigue over it, three consecutive keystrokes of the "e" key to the "e" with an accent grave over it, and four consecutive keystrokes of the "e" key to the "e" with a circumflex over it. After pressing the "e" key five times, the replacement character returns to the initial "e" character. The appropriate replacement character may be entered into a text document or the application program after pressing a key other than the "e" key, or after a delay of more than a threshold amount of time.

The complete set of diacritical characters and their mapping to diacritical variations provided by the French language module 116A in the preferred embodiment are as follows:

| Diacritical character | Diacritical variations |
| --- | --- |
| a | a, à, â, æ |
| c | c, ç |
| e | e, é, è, ê, ë |

-continued

| Diacritical character | Diacritical variations |
| --- | --- |
| i | i, ï |
| o | o, ô |
| u | u, ù, û |
| A | A, À, Â, Æ |
| C | C, Ç |
| E | E, É, È, Ê, Ë |
| I | I, Ï |
| O | O, Ô, Œ |
| U | U, Ù, Û |

In the event where a text string uses multiple consecutive entries of the same character, and that character is a diacritical character or a replacement character, a break key could be used. A break key such as CTRL could be used to signal that the same diacritical character or the replacement character is to be entered into the text document or application program. For example, to enter a string "aaab" where "a" is a diacritical character, the following key sequence could be used: "a, CTRL+a, a, CTRL+a, a, b," where "CTRL+a" indicates that the "a" and "CTRL" keys are pressed together. Alternately, pressing and releasing the CTRL key or SHIFT key could be used to indicate a break between keystrokes, in which case the sequence: "a, CTRL, a" would indicate a sequence of two "a" characters to be entered into the text document or application program, that are not to be mapped to a replacement character.

One embodiment of the language-specific version of the international keyboard performs text entry so as to maximize the user's typing speed. In this embodiment, a statistical weighting analysis may be performed to determine the frequency at which individual diacritical variations of each diacritical character occurs in the selected language. This information may then be used to determine the placement of the diacritical variation in the selection sequence for those characters. Thus, the most frequent diacritical variation of the diacritical character is selected with one keystroke, the next most frequent with two keystrokes, etc.

For example, customizing existing U.S. keyboards for entering text in the Czech language requires diacritical variations of twenty-six diacritical characters:

| Diacritical character | Diacritical variations |
| --- | --- |
| a | a, á |
| c | c, č |
| d | d, ď |
| e | e, ě, é |
| i | i, í |
| n | n, ň |
| o | o, ó |
| r | r, ř |
| s | s, š |
| t | t, ť |
| u | u, ů, ú |
| y | y, ý |
| z | z, ž |
| A | A, Á |
| C | C, Č |
| D | D, Ď |
| E | E, Ě, É |
| I | I, Í |
| N | N, Ň |
| O | O, Ó |
| R | R, Ř |

-continued

| Diacritical character | Diacritical variations |
|---|---|
| S | S, Š |
| T | T, Ť |
| U | U, Ů, Ú |
| Y | Y, Ý |
| Z | Z, Ž |

Twenty-two of the twenty-six diacritical variations require only one or two keystrokes during text entry. Four characters, "e", "u", "E", and "U", require one, two, or three keystrokes, allowing entry of three diacritical variations on these characters. Here, a determination may be made as to which of the diacritical variations of each of the twenty-six characters occurs most often. For example, this determination could be made using statistical weighting. One skilled in the art would be familiar with any of several methods of statistical weighting. In the case of the character "e", for example, if it is determined that the "e" is used most often, the ě is used second most, and the é is used least, it would make sense to create a distinct set of mappings 118C such that one press of the "e" key followed by another key results in the one "e" keystroke being mapped to the "e" character. Similarly, two presses of the "e" key followed by another character results in an ě, and so on. In this way, wasteful keystrokes are minimized and the user's typing speed is maximized.

In another example, customizing existing U.S. keyboards for entering text in the Slovak language requires diacritical variations of twenty-eight characters:

| Diacritical character | Diacritical variations |
|---|---|
| a | a, á, ä |
| c | c, č |
| d | d, ď |
| e | e, é |
| i | i, í |
| l | l, ĺ, ľ |
| n | n, ň |
| o | o, ó, ô |
| r | r, ŕ |
| s | s, š |
| t | t, ť |
| u | u, ú |
| y | y, ý |
| z | z, ž |
| A | A, Á, Ä |
| C | C, Č |
| D | D, Ď |
| E | E, É |
| I | I, Í |
| L | L, Ĺ, Ľ |
| N | N, Ň |
| O | O, Ó, Ô |
| R | R, Ŕ |
| S | S, Š |
| T | T, Ť |
| U | U, Ú |
| Y | Y, Ý |
| Z | Z, Ž |

In this example, twenty-two of the twenty-eight characters require one or two keystrokes during text entry. Six characters, "a", "l", "o", "A", "L", and "O", require one, two, or three keystrokes to allow entry of the diacritical variations available with each of these diacritical characters.

Again, a statistical weighting analysis can be used to determine which of the diacritical variations of the above twenty-eight characters occur most often and least often. It should be noted that other types of weighting or determinations could be made to assign the order in which diacritical variations of a diacritical character are mapped to replacement characters. For example, a simple empirical test could be used to assign the mapping of multiple identical consecutive keystrokes to replacement characters. In this case, the distinct set of mappings 118B could be constructed to minimize wasteful keystrokes, thereby maximizing the user's typing speed by mapping the most often used diacritical variations of a diacritical character to the least number of keystrokes of that diacritical character.

In one embodiment of the invention, the language specific modules 116 (116A, 116B, etc.) are modular in that additional language specific modules 116 can be added to the system as required to create a customized bank of language modules to accommodate the user's multi-lingual communication needs. Importantly, the invention is not limited to any particular languages, nor to any particular number of language specific modules, nor to any particular distinct sets of mappings.

Figure 2:
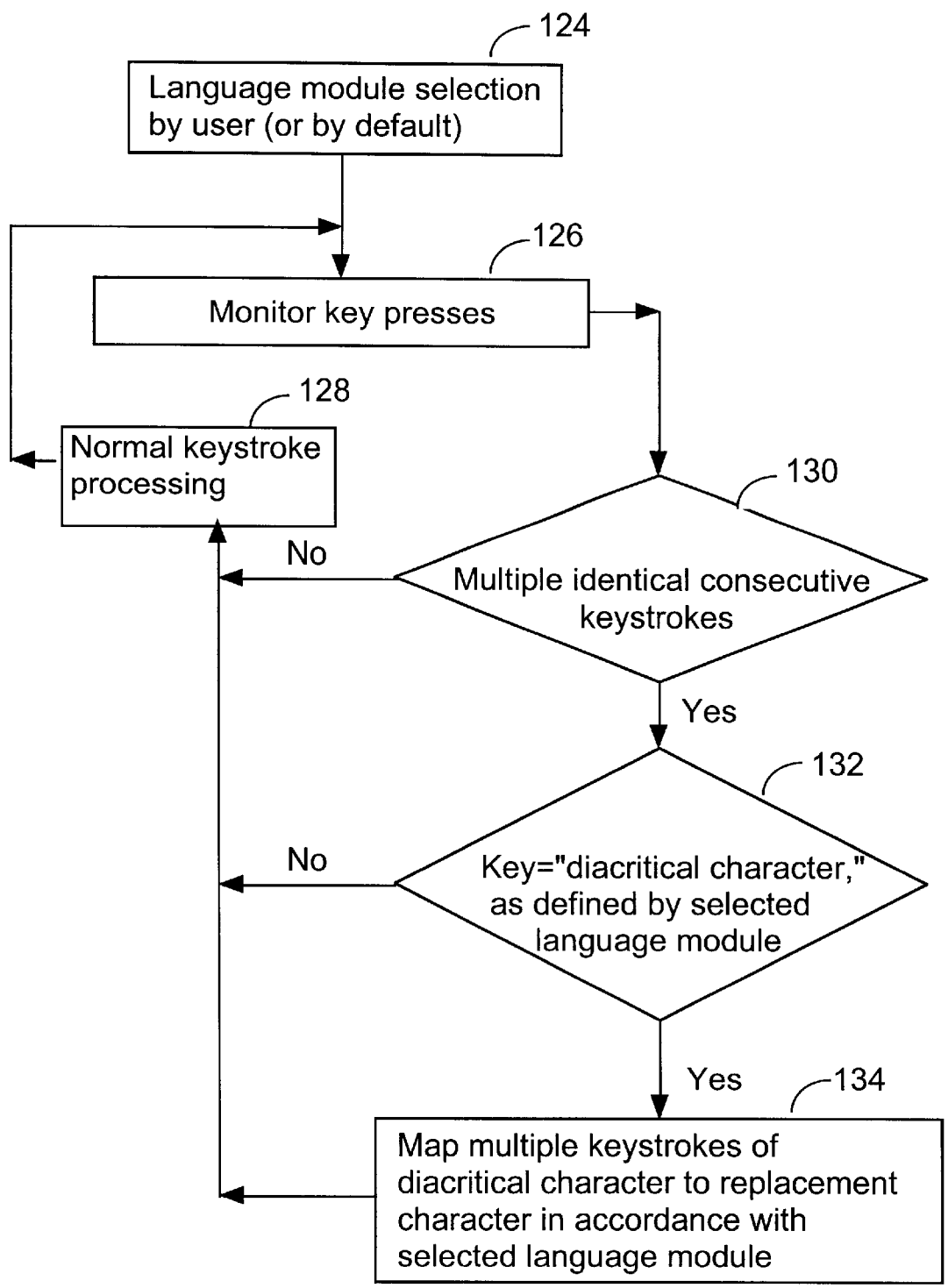
FIG. 2 is a conceptual flow chart depicting operation of an international keyboard in accordance with an embodiment of the present invention.

Referring to FIG. 2, there is shown a flow diagram illustrating the operations of a computer system that incorporates an embodiment of the invention. Specifically, memory 108 includes a procedure for mapping diacritical variations of a diacritical character into a replacement character using any keyboard of the users choosing. This procedure is represented by each of the language specific modules 116 and their respective distinct sets of language specific mappings 118, having instructions for performing the steps shown in FIG. 2. Accordingly, in step 124, the user selects a language module 116. Alternatively, if no language module is selected, the program will assign a default language module corresponding to a language for which a mapping 118 is available in language module 116. The default language module could be set by the user while installing and setting up the program, it could be the language module corresponding to the physical keyboard that forms part of the computer's user interface 105, it could be an arbitrarily set language module, or the default language module could be set by any number of other selection parameters.

During execution of an application program 114 (FIG. 1), the computer monitors the user's key presses for the occurrence of multiple identical consecutive keystrokes (126). The monitoring operation of step 126 can be performed by a keyboard interface program or other procedure in the operating system 110 (FIG. 1), by the application program 114, or by the selected language module 116. If no multiple identical consecutive keystrokes occur (130-No), normal keystroke processing occurs (128). However, if multiple identical consecutive keystrokes are detected (130-Yes), a determination is made as to whether the multiple identical consecutive keystrokes are keystrokes of a diacritical character or some other character (132). If the multiple identical consecutive keystrokes are those of some other character (132-No), only normal keystroke processing is performed (128). However, if the multiple identical consecutive keystrokes are of a diacritical character (132-Yes), the multiple keystrokes are mapped to the designated replacement character in accordance with the selected language module (134), and then normal keystroke processing is performed on the replacement character (128). Normal keystroke processing is typically performed by the application program thereby allowing multiple language keyboard entry on the keyboard that the user is currently using. For instance, the application program may insert the character associated with a keystroke, or the replacement character, into a text document.

Additional Language Specific Mappings

Customizing existing U.S. keyboards for entering text in the Spanish language requires diacritical variations of fourteen characters:

| Diacritical character | Diacritical variations |
|---|---|
| ! | !, ¡ |
| ? | ?, ¿ |
| a | a, á |
| e | e, é |
| i | i, í |
| n | n, ñ |
| o | o, ó |
| u | u, ú, ü |
| A | A, Á |
| E | E, É |
| I | I, Í |
| N | N, Ñ |
| O | O, Ó |
| U | U, Ú, Ü |

Customizing existing U.S. keyboards for entering text in the German language requires diacritical variations of eight characters:

| Diacritical character | Diacritical variations |
|---|---|
| a | a, ä |
| o | o, ö |
| s | s, β |
| u | u, ü |
| A | A, Ä |
| O | O, Ö |
| S | S, β |
| U | U, Ü |

Of course, many more language specific mappings can be defined.

Alternate Embodiments

The present invention can be implemented as a computer program product that includes a computer program mechanism embedded in a computer readable storage medium. For instance, the computer program product could contain the program modules 116 shown in FIG. 1. These program modules may be stored on a CD-ROM, magnetic disk storage product, or any other computer readable data or program storage product. The software modules in the computer program product may also be distributed electronically, via the Internet or otherwise, by transmission of a computer data signal in which the software modules are embedded.

While the present invention has been described with reference to a few specific embodiments, the description is illustrative of the invention and is not to be construed as limiting the invention. Various modifications may occur to those skilled in the art without departing from the true spirit and scope of the invention as defined by the appended claims.

What is claimed is:

1. A computer implemented method of processing user keystrokes entered on a keyboard having a distinct set of alphabetical keys and number keys, comprising:

monitoring user keystrokes;

detecting user entry of consecutive keystrokes of any one key of a set of alphabetical keys wherein each key of a first subset of the set of alphabetical keys corresponds to a diacritical character in a predefined set of diacritical characters and each key of a second subset of the set of alphabetical keys corresponds to a non-diacritical character;

when the one key is in the first subset of the set of alphabetical keys, mapping the detected consecutive keystrokes into a character selected from a set consisting of the diacritical character corresponding to the one key and a replacement character that is a variation of the diacritical character in accordance with a predefined set of keystroke mappings; and when the one key is in the second subset of the set of alphabetical keys, mapping the detected consecutive keystrokes into consecutive occurrences of the non-diacritical character corresponding to the one key.

2. The method of claim 1, including selecting one of a plurality of predefined language specific modules, each language specific module defining a distinct set of mappings, each language specific module defining the first and second subsets in accordance with the selected language specific module, each distinct set of mappings specifying a respective character for use when the user enters consecutive keystrokes of any one key of the set of alphabetical keys when the one key is in the first subset of the set of alphabetical keys.

3. The method of claim 1, wherein the monitoring is performed by an application program, the method including passing the replacement characters to the application program for processing.

4. The method of claim 1, wherein the mapping step includes:

mapping a first number of consecutive "o" keystrokes into an "ó" character;

mapping a second number of consecutive "o" keystrokes into an "ô" character;

mapping a third number of consecutive "l" keystrokes into an "í" character; and mapping a fourth number of consecutive "l" keystrokes into an "î" character.

5. The method of claim 1, wherein the mapping step includes:

mapping a first number of consecutive "a" keystrokes into an "ä" character;

mapping the first number of consecutive "o" keystrokes into an "ö" character;

mapping the first number of consecutive "s" keystrokes into an "β" character; and mapping the first number of consecutive "u" keystrokes into an "ü" character.

6. The method of claim 1, wherein the mapping step includes:

mapping a first number of consecutive "n" keystrokes into a "ñ" character;

mapping the first number of consecutive "!" keystrokes into a "¡" character; and mapping the first number of consecutive "?" keystrokes into a "¿" character.

7. The method of claim 1, wherein, regardless of the number of consecutive keystrokes of the one key in the first subset of the set of alphabetical keys, the detected consecutive keystrokes are mapped into a character selected from the set consisting of the diacritical character corresponding to the one key and a replacement character that is a variation of the diacritical character.

8. The method of claim 1, further comprising detecting user entry of a keystroke corresponding to a break key; and upon detecting the keystroke corresponding to the break key, mapping the consecutive keystrokes into consecutive occurrences of the character selected from the set consisting of the diacritical character corresponding to the one key and a replacement character that is a variation of the diacritical character.

9. The method of claim 1, wherein the mapping step includes:

mapping a first number of consecutive "e" keystrokes into an "é" character;

mapping a second number of consecutive "e" keystrokes into an "è" character; and mapping a third number of consecutive "e" keystrokes into an "ê" character.

10. The method of claim 9, wherein the mapping step includes:

mapping a fourth number of consecutive "c" keystrokes into a "ç" character.

11. A computer system, comprising:

a keyboard having a distinct set of alphabetical keys and number keys wherein each key of a first subset of the set of alphabetical keys corresponds to a diacritical character in a predefined set of diacritical characters and each key of a second subset of the set of alphabetical keys corresponds to a non-diacritical character;

a keystroke mapping module defining first and second distinct sets of mappings, wherein the first distinct set of mappings maps consecutive keystrokes of any one key in the first subset into a character selected from a set consisting of the diacritical character corresponding to the one key and a replacement character that is a variation of the diacritical character; and wherein the second distinct set of mappings maps consecutive keystrokes of any one key in the second subset into consecutive occurrences of the non-diacritical character corresponding to the one key; and an application program, coupled to the keystroke mapping module, for processing characters corresponding to keystrokes entered by a user on the keyboard, including characters generated in accordance with the first and second distinct sets of mappings.

12. The computer system of claim 11, wherein the keystroke mapping module is a selected one of a plurality of predefined language specific modules, each predefined language specific module defining a distinct set of mappings, each mapping specifying a respective character for use when the user enters consecutive keystrokes of any one key of the set of alphabetical keys; and wherein the application program includes instructions for selecting one of the predefined language specific modules.

13. The computer system of claim 11, wherein the distinct set of mappings defined by the language specific module include mappings for:

mapping a first number of consecutive "o" keystrokes into an "ó" character;

mapping a second number of consecutive "o" keystrokes into an "ô" character;

mapping a third number of consecutive "l" keystrokes into an "l'" character; and mapping a fourth of consecutive "l" keystrokes into an " l" character.

14. The computer system of claim 9, wherein the distinct set of mappings defined by the language specific module include mappings for:

mapping a first number of consecutive "a" keystrokes into an "ä" character;

mapping the first number of consecutive "o" keystrokes into an "ö" character;

mapping the first number of consecutive "s" keystrokes into an "β" character; and mapping the first number of consecutive "u" keystrokes into an "ü" character.

15. The computer system of claim 9, wherein the distinct set of mappings defined by the language specific module include mappings for:

mapping a first number of consecutive "n" keystrokes into a "ñ" character;

mapping the first number of consecutive "!" keystrokes into a "¡" character; and mapping the first number of consecutive "?" keystrokes into a "¿" character.

16. The computer system of claim 11, wherein the keystroke mapping module is configured so that, regardless of the number of consecutive keystrokes of the one key in the first subset, the detected consecutive keystrokes are mapped into a character selected from the set consisting of the diacritical character corresponding to the one key and a replacement character that is a variation of the diacritical character.

17. The computer system of claim 11, wherein the keystroke mapping module is configured to detect user entry of a keystroke corresponding to a break key, and upon detecting the keystroke corresponding to the break key, to map the consecutive keystrokes into consecutive occurrences of a character selected from the set consisting of the diacritical character corresponding to the one key and a replacement character that is a variation of the diacritical character.

18. The computer system of claim 9, wherein the distinct set of mappings defined by the language specific module include mappings for:

mapping a first number of consecutive "e" keystrokes into an "é" character;

mapping a second number of consecutive "e" keystrokes into an "è" character; and mapping a third number of consecutive "e" keystrokes into an "ê" character.

19. The computer system of claim 18, wherein the distinct set of mappings defined by the language specific module include mappings for:

mapping a fourth number of consecutive "c" keystrokes into a "ç" character.

20. A computer program product for use in conjunction with a computer system that includes a keyboard having a distinct set of alphabetical keys and number keys wherein each key of a first subset of the set of alphabetical keys corresponds to a diacritical character in a predefined set of diacritical characters and each key of a second subset of the set of alphabetical keys corresponds to a non-diacritical character, the computer program product comprising a computer readable storage medium and a computer program mechanism embedded therein, the computer program mechanism comprising:

a keystroke mapping module defining first and second distinct sets of mappings, wherein the first distinct set of mappings maps consecutive keystrokes of any one key in the first subset into a character selected from a set consisting of the diacritical character corresponding to the one key and a replacement character that is a variation of the diacritical character; and wherein the second distinct set of mappings maps consecutive keystrokes of any one key in the second subset into consecutive occurrences of the non-diacritical character corresponding to the one key;

wherein the keystroke mapping module is configured for use in conjunction with an application program for processing characters corresponding to keystrokes entered by a user on the keyboard, including characters generated in accordance with the first and second distinct sets of mappings.

21. The computer program product of claim 20, including a plurality of predefined language specific modules, each predefined language specific module defining a distinct set of mappings, each mapping specifying a respective character for use when the user enters consecutive keystrokes of any one alphabetical key of the set of alphabetical keys; and wherein the application program includes instructions for selecting one of the predefined language specific modules.

22. The computer program product of claim 20, wherein the distinct set of mappings defined by the language specific module include mappings for:

mapping a first number of consecutive "o" keystrokes into an "ó" character;

mapping a second number of consecutive "o" keystrokes into an "ô" character;

mapping a third number of consecutive "l" keystrokes into "í"; and mapping a fourth number of consecutive "l" keystrokes into an "ï" character.

23. The computer program product of claim 16, wherein the distinct set of mappings defined by the language specific module include mappings for:

mapping a first number of consecutive "a" keystrokes into an "ä" character;

mapping the first number of consecutive "o" keystrokes into an "ö" character;

mapping the first number of consecutive "s" keystrokes into an "β" character; and mapping the first number of consecutive "u" keystrokes into an "ü" character.

24. The computer program product of claim 16, wherein the distinct set of mappings defined by the language specific module include mappings for:

mapping a first number of consecutive "n" keystrokes into a "ñ" character;

mapping the first number of consecutive "!" keystrokes into a "¡" character; and mapping the first number of consecutive "?" keystrokes into a "¿" character.

25. The method of claim 20, wherein the keystroke mapping module is configured so that, regardless of the number of consecutive keystrokes of the one key in the first subset, the detected consecutive keystrokes are mapped into a character selected from the set consisting of the diacritical character corresponding to the one key and a replacement character that is a variation of the diacritical character.

26. The method of claim 20, wherein the keystroke mapping module is configured to detect user entry of a keystroke corresponding to a break key, and upon detecting the keystroke corresponding to the break key, to map the consecutive keystrokes into consecutive occurrences of a character selected from the set consisting of the diacritical character corresponding to the one key and a replacement character that is a variation of the diacritical character.

27. The computer program product of claim 16, wherein the distinct set of mappings defined by the language specific module include mappings for:

mapping a first number of consecutive "e" keystrokes into an "é" character;

mapping a second number of consecutive "e" keystrokes into an "è" character; and mapping a third number of consecutive "e" keystrokes into an "ê" character.

28. The computer program product of claim 27, wherein the distinct set of mappings defined by the language specific module include mappings for:

mapping a fourth number of consecutive "c" keystrokes into a "ç" character.

* * * * *